United States Patent
Hartzell et al.

(10) Patent No.: US 7,581,738 B1
(45) Date of Patent: Sep. 1, 2009

(54) MOVEABLE STORAGE STRUCTURE SYSTEM

(75) Inventors: Craig W Hartzell, Morgantown, WV (US); Kevin G Koch, Fairmont, WV (US); Aaron M King, Kingwood, WV (US)

(73) Assignee: Azimuth, Inc., Morgantown, WV (US)

( * ) Notice: Subject to any disclaimer, the term of this patent is extended or adjusted under 35 U.S.C. 154(b) by 130 days.

(21) Appl. No.: 11/348,140

(22) Filed: Feb. 6, 2006

(51) Int. Cl.
*B62B 3/00* (2006.01)
(52) U.S. Cl. ..................... 280/79.3; 211/162
(58) Field of Classification Search .............. 280/79.11, 280/79.2, 79.3, 47.34, 47.35; 410/3, 4, 30; 267/148; 104/249, 250; 211/162
See application file for complete search history.

(56) References Cited

U.S. PATENT DOCUMENTS

| | | | | |
|---|---|---|---|---|
| 2,535,963 A | * | 12/1950 | Sisemore | 55/429 |
| 2,744,765 A | * | 5/1956 | Ferrier | 280/685 |
| 3,302,955 A | * | 2/1967 | Witzgall | 280/79.2 |
| 3,404,425 A | * | 10/1968 | Wilder | 16/30 |
| 3,734,526 A | * | 5/1973 | Propst et al. | 280/33.998 |
| 4,032,167 A | * | 6/1977 | Chereda | 410/3 |
| 4,231,695 A | * | 11/1980 | Weston, Sr. | 410/69 |
| 4,807,765 A | * | 2/1989 | Brown et al. | 211/162 |
| 4,846,627 A | * | 7/1989 | Steuart | 414/800 |
| 6,364,330 B1 | * | 4/2002 | Weber et al. | 280/47.35 |
| 6,406,011 B1 | * | 6/2002 | Kosar et al. | 267/148 |
| 6,460,950 B2 | * | 10/2002 | Spitzer et al. | 312/249.8 |
| 6,681,702 B1 | * | 1/2004 | Nicely | 105/157.1 |
| 6,899,508 B2 | * | 5/2005 | Krawczyk | 414/537 |
| 7,131,543 B2 | * | 11/2006 | Mason | 211/59.2 |
| 7,213,819 B2 | * | 5/2007 | Carbonero | 280/79.11 |

* cited by examiner

*Primary Examiner*—Frank B Vanaman
(74) *Attorney, Agent, or Firm*—Dinsmore & Shohl, LLP; Monika J. Hussell (57) ABSTRACT

A moveable storage structure system, a device for supporting and allowing mobility of a storage structure, and, in some embodiments, moveable storage structure systems and devices that stabilize and minimize vibrations of equipment supported within a storage structure. The moveable storage structure system includes a sled, one or more wheels, and a storage structure. The device includes a sled, and one or more wheels or sets of wheels. This system and device may further include vibration dampening components that minimize vibration of equipment supported within the storage structure during mobilization of the system and the structure. The present invention contemplates that the moveable storage structure system may be utilized in a variety of settings, such as an office, a storage facility or space, or a mobile shelter or vehicle.

12 Claims, 7 Drawing Sheets

MOVEABLE STORAGE STRUCTURE SYSTEM

BACKGROUND OF THE INVENTION

The present invention relates to a moveable storage structure system and to a device for supporting and allowing mobility of a storage structure, and, in some embodiments, to moveable storage structure systems and devices that stabilize and minimize vibrations of equipment supported within a storage structure during mobilization of the structure, or a mobile shelter, land vehicle, aircraft or watercraft within which the structure is contained.

BRIEF SUMMARY OF THE INVENTION

According to the present invention, a storage structure is supplemented with a support structure and one or more wheels to allow for the mobilization of the storage structure. This system is a moveable storage structure system that generally comprises a sled, one or more wheels, and a storage structure. The present invention further relates to a device for supporting and allowing mobility of a storage structure generally comprising a sled and one or more wheels.

In accordance with the present invention, the sled is designed and configured to support one or more storage structures, and generally comprises a support structure or plate, and means to receive wheels on the underside of said plate.

The storage structure used with the present invention typically (but not necessarily) comprises at least one shelf, and may be configured as a shelving unit or other similar device. Storage structures suitable for use with the present invention include electronic equipment shelving cabinets, which store electronic equipment substantially free from dust, sand and dirt that may otherwise be in the environment in which the structure is located.

The wheels used with the present invention may be any commonly used wheel device such as, but not limited to, press-fit wheels or caster wheels, and may be configured as one or more sets of wheels. In practice, these wheels are typically secured to the underside portion of the plate of the sled.

The moveable storage structure system and device of the present invention may further comprise vibration dampening means to stabilize and minimize vibrations of equipment supported within the storage structure. The vibration dampening means are preferably engaged between both the plate of the sled and the storage structure.

To restrain the mobility of the system, the system may comprise at least one floor brace having or forming a channel. In use, the floor brace is secured to a horizontal structure, such as a floor, and is configured to receive the wheels while allowing the wheels to move within the channel of the floor brace.

Further restraints on the mobility of the system may include means to removably affix the system of the present invention to a vertical structure, such as a wall. Incorporated into said affixation means, and to further isolate the storage structure from vibration, may be one or more vibration dampening means engaged between the storage structure and the vertical structure.

It is contemplated by the present invention that the moveable storage structure system and the device of the present invention may be utilized in a variety of settings, such as an office, a storage facility or space, or a mobile shelter or vehicle.

Accordingly, it is an object of the present invention to enable the mobilization of storage structures. It is an object of some embodiments of the invention to stabilize and minimize vibrations of equipment held within storage structures during the mobilization of the storage structure or the mobile shelter in which the structure is contained. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Referring generally to the figures, the present invention relates to a moveable storage structure system 10 and to a device 100 for supporting and allowing mobility of one or more storage structures 40, and, in some embodiments, to moveable storage structure systems 10 and devices 100 that stabilize and minimize vibrations of equipment supported within a storage structure 40 during mobilization of the system or movement of the structure within which it is housed. As discussed above, the movable storage structure system 10 of the present invention generally comprises a sled 20, one or more wheels 30, and a storage structure 40. The device 100 of the present invention generally comprises a sled 20 and one or more wheels 30. An embodiment of the moveable storage structure system 10 and the device 100 (as used with a storage structure 40) of the present invention, is illustrated in FIGS. 1-3 and 12.

Figure 8:
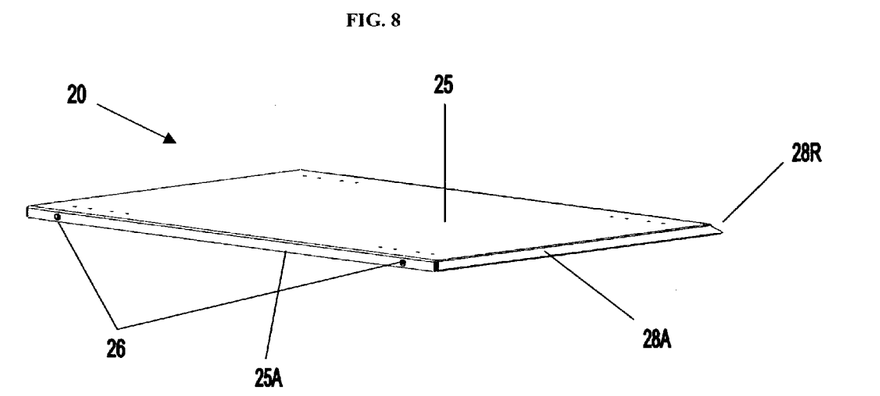
FIG. 8 is a perspective view of a type of sled suitable for use in the present invention.
Figure 9:
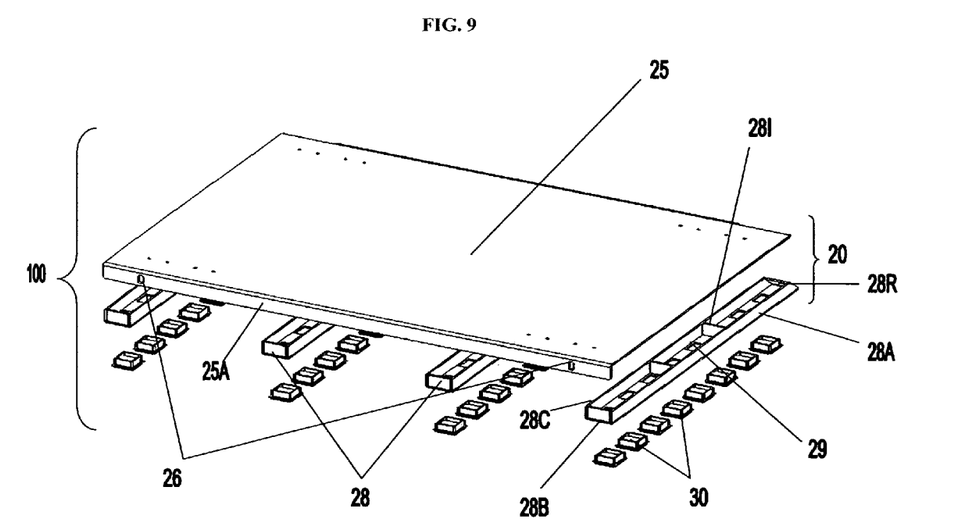
FIG. 9 is an illustration of an embodiment of a disassembled sled of the present invention.

As depicted in FIGS. 8 and 9, the sled 20 of the present invention generally comprises a plate 25 and means 28 to receive the wheels 30 on the underside of said plate 25. The plate 25 may comprise one or more walls 25A and 25B, affixed perpendicularly from the relative edges of the plate 25, to further strengthen the sled 20 and for other purposes as hereinafter described. Some of said walls 25A and 25B may need to be designed to accommodate floor braces, as hereinafter described. The sled 20 and its components may be constructed of any one or more materials, or combinations of materials, suitable to support a storage structure 40, and are preferably constructed of several pieces of aluminum, welded together. Preferably, the plate 25 has a thickness of between 3/16" and 1/4". Depending on the type of wheels 30 used, the means 28 to receive the same may be, for example but without limitation, bolt holes, allowing the wheel housing to be bolted to the underside of the plate 25 or, as shown in FIGS. 8 and 9, structures bolted, welded or otherwise affixed to the plate 25, configured, sized and positioned thereon to receive the wheel housing of multiple wheel systems (such as for use with press-fit wheels). The specific embodiment shown in FIG. 9 has four exterior walls 28A, 28B, 28C and 28R, two interior structural walls 28I, and several lateral walls forming apertures 29 sized and configured to receive the housing of standard press-fit wheels 30. The sled 20 may be sized and configured to accommodate and support multiple storage structures 40.

The wheels 30 of the system 10 and device 100 of the present invention may be any commonly used wheel device, such as, but not limited to, press-fit wheels or caster wheels, and may be configured as one or more sets of wheels. As shown in FIGS. 4, 9, 10 and 11, these wheels 30 are secured to the underside portion of the plate 25, directly or via the structure 28.

The storage structure 40 used as part of the system 10 or with the device 100 may comprise at least one shelf, and may be configured as a shelving unit or other similar device. The storage structure 40 may further comprise one or more doors 41 on one or more walls 42, a floor and a roof 43, to allow for the enclosure of the interior area of the storage structure 40. In an embodiment, the storage structure 40 comprises EIA rails that are configured to mount electronic equipment. Storage structures suitable for use with the present invention include electronic equipment shelving cabinets, which store electronic equipment substantially free from dust, sand and dirt that may otherwise be in the environment in which the structure is located.

Figure 6:
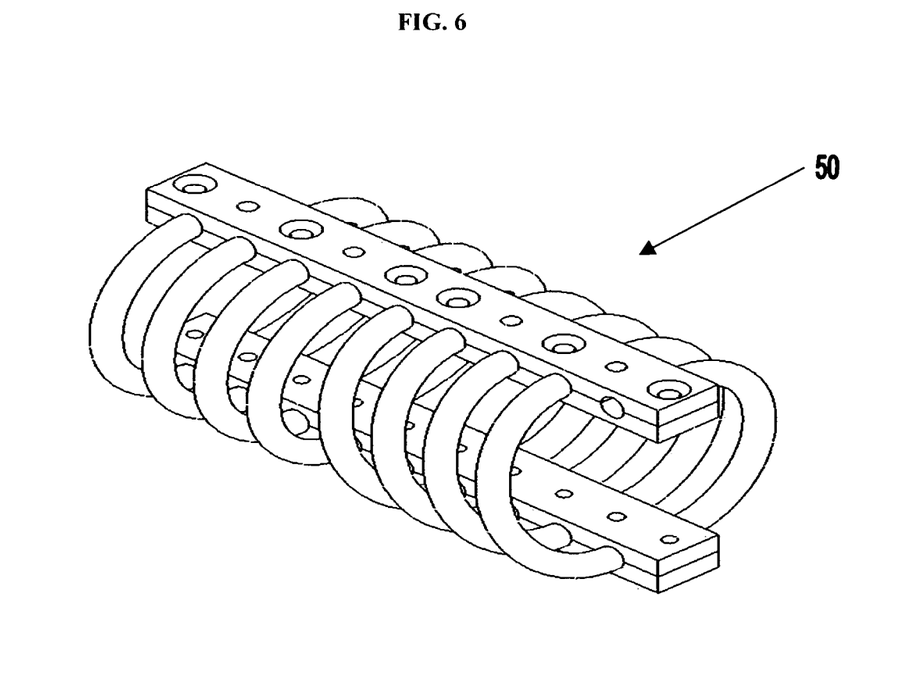
FIG. 6 is a perspective view of a type of vibration dampening means suitable for use in the present invention.
Figure 10:
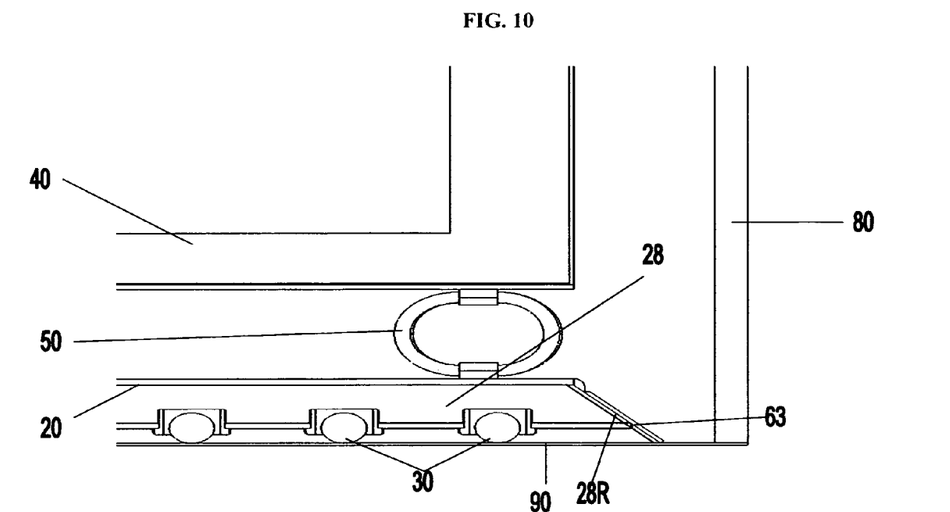
FIG. 10 is a partial view of an embodiment of the moveable storage structure system (and the device, as used with a storage structure) of the present invention, with a wall of the floor brace removed to further review the embodiment of the present invention.
Figure 11:
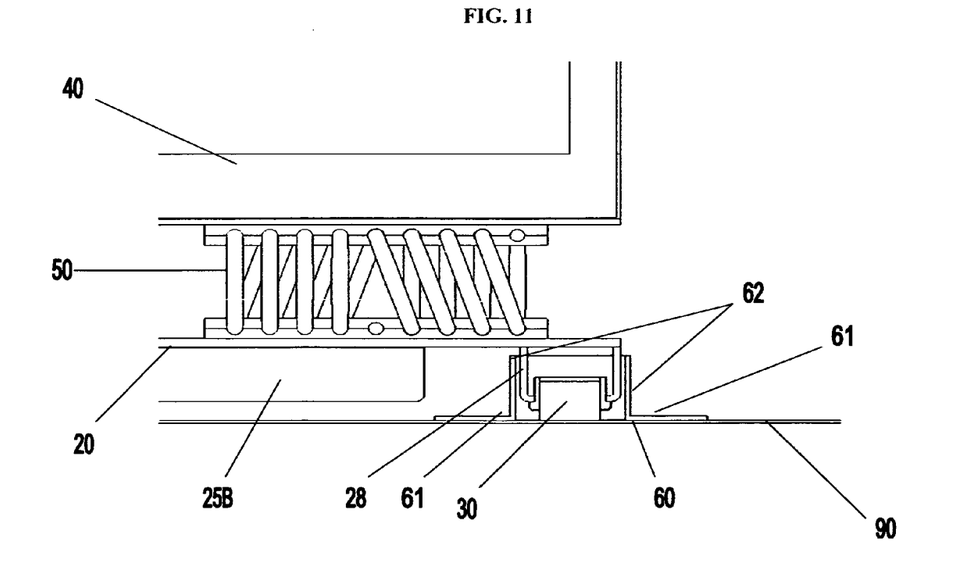
FIG. 11 is a front partial view of an embodiment of the system of the present invention, with a front wall of the plate removed to further view the embodiment of the present invention.

To minimize the vibration of the equipment or other products held within the storage structure 40 during the mobilization of the system 10 or the device 100 used with the system, or the structure within which the system is housed, vibration dampening means 50 may be affixed (directly or indirectly) to the plate 25 and the storage structure 40. In an embodiment of the present invention, this vibration dampening means 50 comprises at least one vibration isolator, preferably a helical wire rope isolator as shown in FIG. 6. More preferably, the system 10 or the device 100 has four vibration dampening means 50, symmetrically positioned on and secured to the plate 25 and capable of affixation to the bottom portion of the storage structure 40. As depicted in FIGS. 10 and 11, the vibration dampening means 50 may be secured to the plate 25 and/or the storage structure 40 by means of bolting, or any other method as necessary to secure the means 50 to the associated structure.

Figure 5:
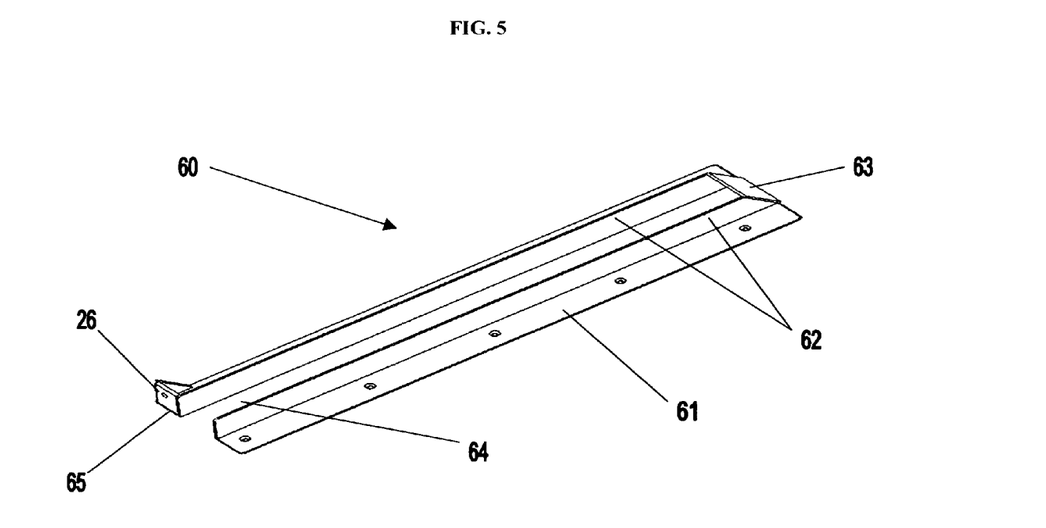
FIG. 5 is a perspective view of a floor brace suitable for use in the present invention showing in this embodiment a defined space to hold and constrain some of the wheels of the system, and a sloped edge in the rear of the brace to restrain the sled of the system.

To restrain the mobility of the system 10, the system 10 may further comprise at least one floor brace 60. In use, the floor brace 60 is secured, by bolts or other suitable securing means, to a horizontal structure 90, such as a floor. As shown in FIG. 5, each floor brace 60 preferably comprises two base plates 61 and two side walls 62 extending perpendicularly from such plates 61, forming a channel 64 to receive the wheels 30 with or without the structure 28, and restrain movement of the same to the linear direction of the channel 64. The plates 61 and/or the walls 62 may be interconnected by a channel plate 63, extending perpendicularly from either or both the plates 61 and the walls 62, across and in the rearmost portion of the channel 64 of such floor brace, to restrict the mobility of the wheels 30 on the sled 20. The elements of the base plate may be constructed from any one or more materials suitable for securing the same to the floor and restraining movement of the wheels 30; preferably the components of the base plate 61 are constructed of steel. It is contemplated by the present invention, although not depicted in the drawings, that the floor brace 60 may comprise a lipped edge superior to the wheels 30, to limit the upward mobility of the wheels 30. As depicted in FIG. 10, in a preferred embodiment of the present invention, at least a portion of the rear wall 28R of the sled 20 and the channel plate 63 are positioned at corresponding angles from perpendicular such that, when the sled 20 is in the most rearward position of the floor brace 60, said rear wall 28R is in press-fit alignment with the channel plate 63. This rear wall 28R may be part of the structure 28, or part of the rear wall 25B (or a new mini-wall adjacent thereto) extending perpendicularly from the plate 25. In any event, the rear wall 25B should be configured so that, with the exception of the press-fit alignment discussed above, the floor brace does not impede movement of the sled and the wheels along the channel 64.

As shown in FIG. 5, the floor brace 60 may further comprise one or more shunts 65 on either or both of its side walls 62, with one or more apertures 26 therein to receive a bolt or other affixing mechanism when aligned with one or more apertures 26 on wall 25A of the sled 20, so that a bolt and welded nut, or other affixation means, may be used to affix the sled wall with the shunt 65 of the floor brace 60, inhibiting the mobility of the system 10.

Figure 1:
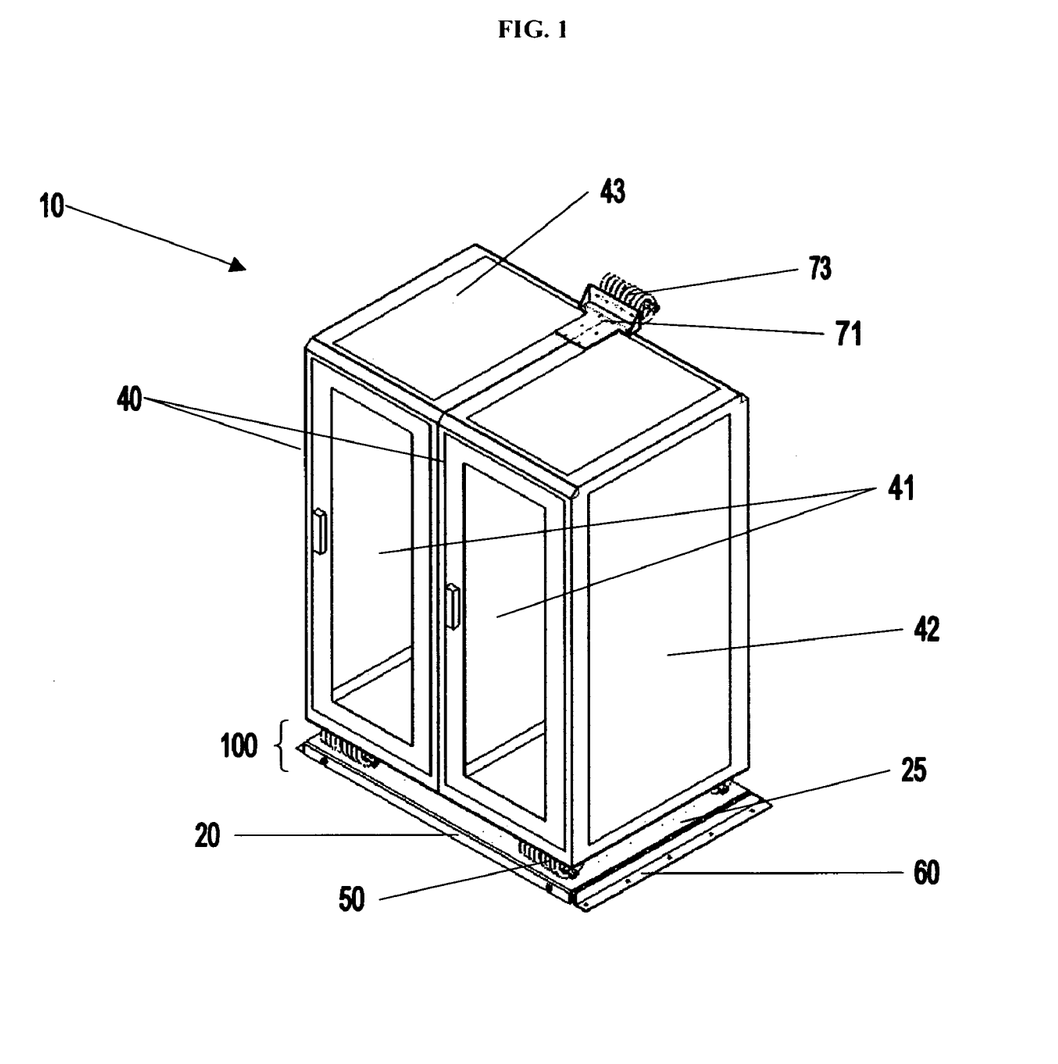
FIG. 1 is a perspective view of an embodiment of the moveable storage structure system of the present invention.
Figure 2:
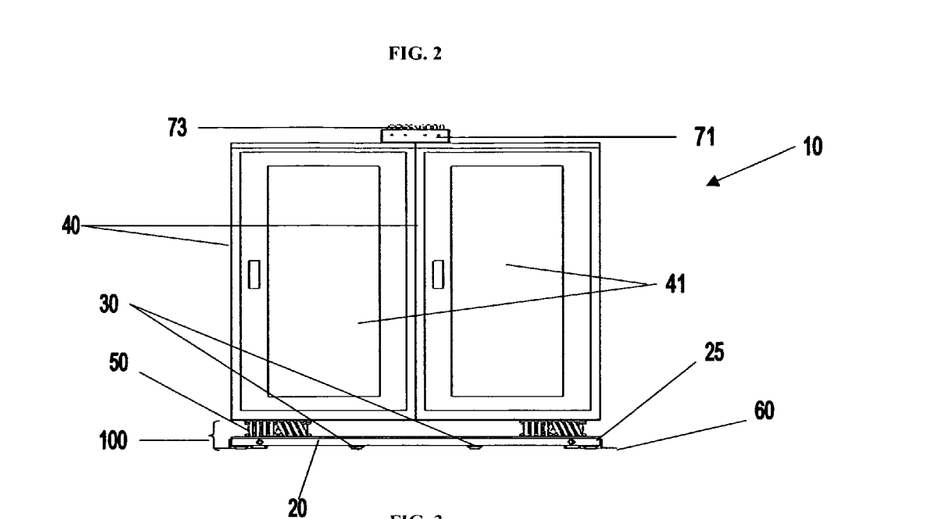
FIG. 2 is a front view of an embodiment of the moveable storage structure system of the present invention.
Figure 3:
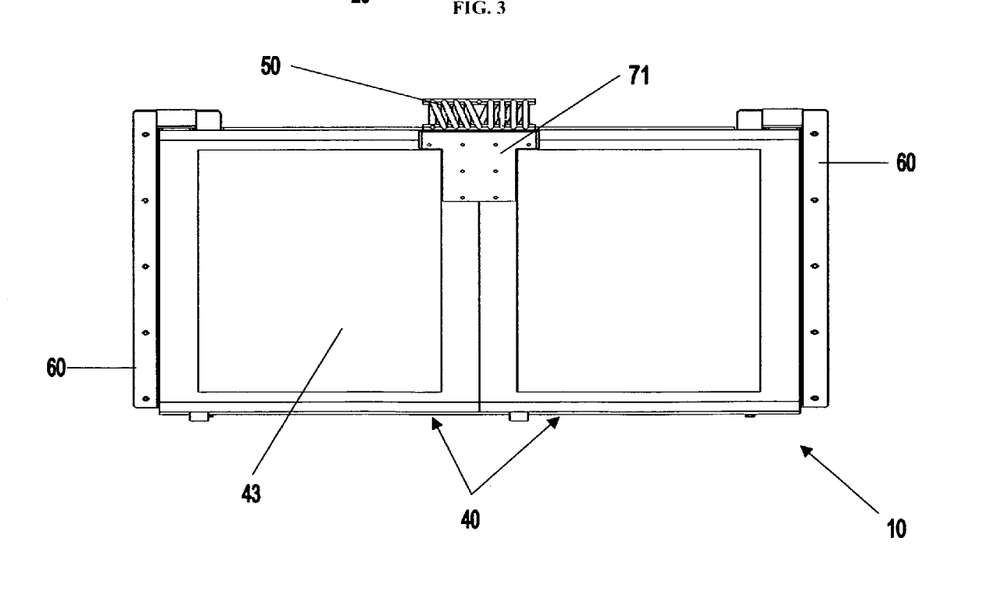
FIG. 3 is a top view of an embodiment of the moveable storage structure system of the present invention.
Figure 4:
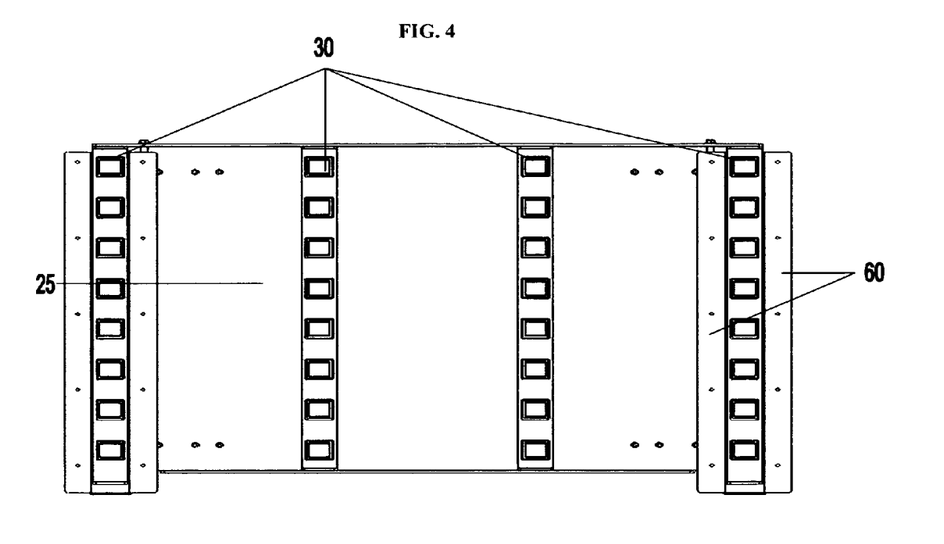
FIG. 4 is a bottom view of some embodiments of the sled of the present invention, having wheels secured to the underside of the sled and constrained within floor braces.
Figure 7:
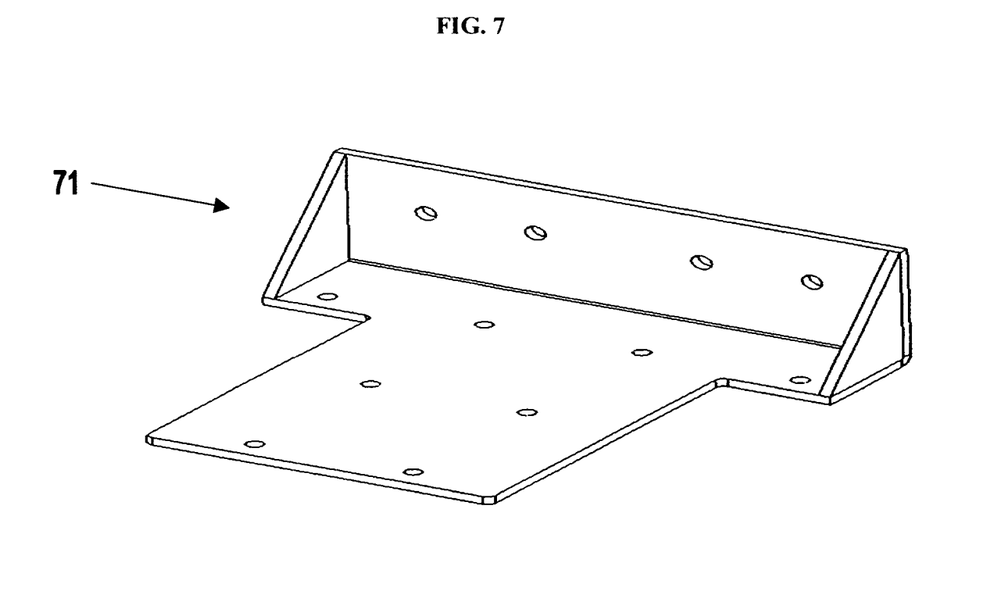
FIG. 7 is a perspective view of a type of upper isolator bracket suitable for use in the present invention.
Figure 12:
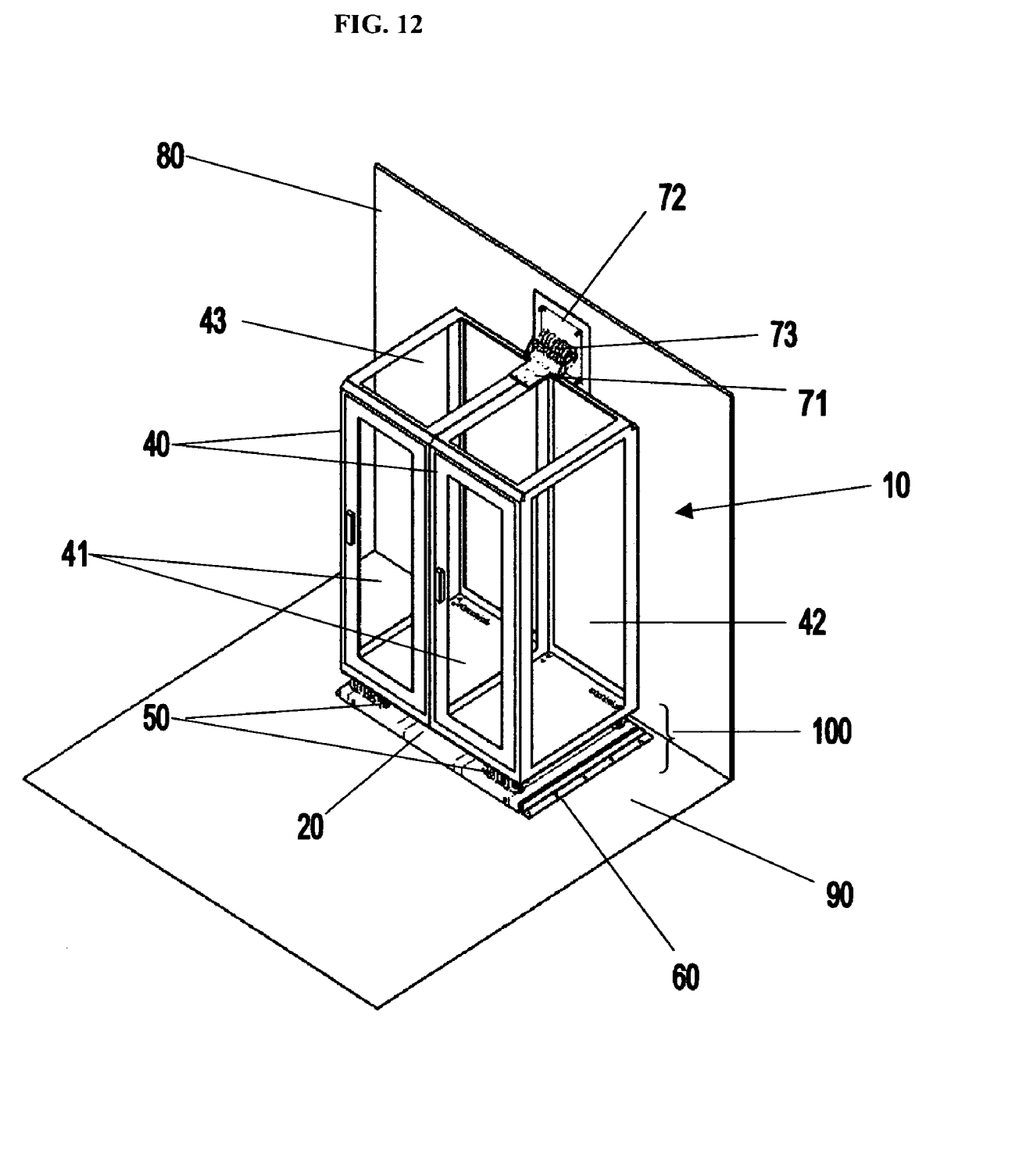
FIG. 12 is a transparent, peripheral view of an embodiment of the system (and the device, as used with a storage structure) of the present invention that is removably affixed to a vertical structure and removably secured to a horizontal structure.

To further restrain the mobility of the system 10, the system 10 may be configured to removably affix to a vertical structure 80, such as a wall. As alternative or additional means to isolate the storage structure 40 from vibration, at least one vibration dampening means 73 may be used to removably affix the system 10 to the vertical structure 80. As depicted in FIGS. 3 and 12, this vibration dampening means 73 is preferably engaged with the storage structure 40 by an upper isolator bracket 71 (an embodiment of which is shown in FIG. 7), and with the vertical structure by a metal plate 72. In this embodiment, when the vibration dampening means 73 is affixed to the storage structure 40 and to the vertical structure 80, the system 10 is immobilized. When, however, the vibration dampening means 50 is removed of its affixation from the vertical structure 80 or the storage structure 40, the same will not inhibit the mobility of the system 10.

It is contemplated by the present invention that the moveable storage structure system 10 and the device 100 used with a storage structure 40, may be utilized in a variety of settings, such as an office, a storage facility or space, or a mobile shelter or vehicle.

In use, a preferred embodiment of the system 10 may be assembled by securing one or more floor braces 60 to a floor 90 in a mobile shelter, positioned to receive the wheels 30 of the sled 20. The sled 20 is assembled by welding, affixing or molding the desired members to the plate 25, and then the wheels 30 may be attached thereto; in some applications, the vibration dampening means 50 are also affixed to the sled 20. At least one storage structure 40 is then positioned on the sled 20 by means of the vibration dampening means 50, if any. Finally, wheels 30 are inserted into the channel 64 of the floor brace 60, and may be secured to inhibit further movement to the floor brace 60 by means of a bolt and nut system through the corresponding apertures of the wall 25A of the sled 20, and the shunts 65 of the floor brace 60. A metal plate 71 may be affixed to the top, back edge of the storage unit, and an upper isolator bracket 72 may be affixed to a wall; another vibration dampening means 73 may then be secured to both the metal plate 72 and the upper isolator bracket 71. To release the system 10 from its restrained position, the bolt and nut system removably affixing the sled to the floor brace is disengaged, and the vibration dampening means 73 is disengaged from either the metal plate 72 or the upper isolator bracket 71.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims.

What is claimed is:

1. A moveable storage structure system comprising: a sled, one or more wheels, a storage structure and at least one floor brace,
    said sled comprises a plate and at least two structures designed and configured to receive a plurality of wheels, said wheel receiving structure having a plurality of exterior walls, including at least one side exterior wall and a rear exterior wall, a plurality of interior walls, and a plurality of lateral walls forming apertures to receive said plurality of wheels, wherein the rear exterior wall extends from a lateral wall at an angle from perpendicular;
    wherein said wheel receiving structures are affixed to said plate,
    said floor brace is designed to receive the wheels and wheel receiving structure of the sled, and comprises two base plates each base plate having a side wall extending perpendicular therefrom to a height sufficient to conceal the wheels and at least a portion of the side exterior wall of the wheel receiving structure when said wheels and wheel receiving structure are received by said floor brace;
    wherein said floor brace further comprises a channel plate affixed to a corresponding end of each of said side walls, said channel plate extending from said side walls at an angle from perpendicular corresponding to the angle from perpendicular of the rear exterior wall of the wheel receiving structure, in relation to the lateral wall of the same, so that when said wheel receiving structure of the sled is fully received within the base plates of the floor brace the channel plate of the floor brace and the rear exterior wall of the wheel receiving structure of the sled are in press fit alignment, with the exterior wall positioned below the channel plate; and
    wherein said sled is configured to support said storage structure.

2. The system of claim 1, wherein: said wheels are press-fit wheels, each having a housing engaged with said wheel, said housing being sized and configured to be received by an aperture of the structures.

3. The system of claim 2, further comprising at least one vibration dampening means engaged with said sled and said storage structure.

4. The system of claim 1, further comprising vibration dampening means engaged with said sled and said storage structure.

5. The system of claim 4, wherein said vibration dampening means comprise at least one vibration isolator.

6. The system of claim 5, wherein said vibration isolator is configured as a helical wire rope isolator.

7. The system of claim 4, wherein said system is configured to removably affix to a vertical structure by vibration dampening means engaged with said storage structure and said vertical structure.

8. The system of claim 1, further comprising a second storage structure, wherein said sled is configured to at least partially support both storage structures.

9. A device for supporting and allowing mobility of a storage structure comprising:
    a sled having a top surface, an underside and a plurality of wheels, and further comprising two structures designed and configured to receive the wheels, said wheel receiving structure having a plurality of exterior walls, including at least one side exterior wall and a rear exterior wall, a plurality of interior walls, and a plurality of lateral walls forming apertures to receive the wheels, wherein the rear exterior wall extends from a lateral wall at an angle from perpendicular;
    vibration dampening means engaged with the top surface of said sled; and
    a floor brace designed to receive the wheels and wheel receiving structure of the sled, comprising two base plates each base plate having a side wall extending perpendicular therefrom to a height sufficient to conceal the wheels and at least a portion of the side exterior wall of the wheel receiving structure when said wheels and wheel receiving structure are received by said floor brace;
    wherein said floor brace further comprises a channel plate affixed to a corresponding end of each of said side walls, said channel plate extending from said side walls at an angle from perpendicular corresponding to the angle from perpendicular of the rear exterior wall of the wheel receiving structure, in relation to the lateral wall of the same, so that when said wheel receiving structure of the sled is fully received within the base plates of the floor brace the channel plate of the floor brace and the rear exterior wall of the wheel receiving structure of the sled are in press fit alignment, with the exterior wall positioned below the channel plate.

10. The device of claim 9, wherein said device is secured to a storage structure or shelving unit.

11. The device of claim 9, wherein said vibration dampening means comprise at least one vibration isolator.

12. The device of claim 11, wherein said vibration isolator is configured as a helical wire rope isolator.

* * * * *

UNITED STATES PATENT AND TRADEMARK OFFICE
CERTIFICATE OF CORRECTION

PATENT NO. : 7,581,738 B1
APPLICATION NO. : 11/348140
DATED : September 1, 2009
INVENTOR(S) : Hartzell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Fourteenth Day of September, 2010

David J. Kappos
*Director of the United States Patent and Trademark Office*